(12) United States Patent
Henkemeyer

(10) Patent No.: US 10,946,613 B2
(45) Date of Patent: Mar. 16, 2021

(54) FIELD EXPEDIENT TEXTILE REPAIR PATCH

(71) Applicant: Source One Tactical, Inc., Lake Worth, FL (US)

(72) Inventor: Jeffrey Henkemeyer, Chanhassen, MN (US)

(73) Assignee: Source One Tactical, Inc., Lake Worth, FL (US)

( * ) Notice: Subject to any disclaimer, the term of this patent is extended or adjusted under 35 U.S.C. 154(b) by 54 days.

(21) Appl. No.: 16/176,069

(22) Filed: Oct. 31, 2018

(65) Prior Publication Data

US 2019/0126586 A1 May 2, 2019

Related U.S. Application Data

(60) Provisional application No. 62/580,738, filed on Nov. 2, 2017.

(51) Int. Cl.

| B32B 5/00 | (2006.01) |
| C09J 7/21 | (2018.01) |
| C09J 7/50 | (2018.01) |
| C09J 7/38 | (2018.01) |
| B29C 63/00 | (2006.01) |
| B32B 37/12 | (2006.01) |
| B29C 63/02 | (2006.01) |

(52) U.S. Cl.
CPC ............ *B32B 5/00* (2013.01); *B29C 63/0095* (2013.01); *C09J 7/21* (2018.01); *C09J 7/38* (2018.01); *C09J 7/50* (2018.01); *B29C 63/02* (2013.01); *B32B 37/12* (2013.01); *B32B 2307/3065* (2013.01); *B32B 2405/00* (2013.01); *B32B 2437/00* (2013.01); *B32B 2556/00* (2013.01); *C09J 2301/122* (2020.08); *C09J 2301/302* (2020.08); *C09J 2400/263* (2013.01); *C09J 2427/003* (2013.01); *Y10T 428/1476* (2015.01)

(58) Field of Classification Search
CPC ... B32B 5/00; B32B 37/12; B32B 2307/3065; B32B 2405/00; B32B 2437/00; B32B 2556/00; B32B 7/12; B32B 5/024; B32B 5/08; B32B 29/02; B32B 2307/748; B32B 2255/102; B32B 2255/12; B32B 2262/0261; C09J 7/50; C09J 7/21; C09J 7/38; C09J 2201/122; C09J 2201/606; C09J 2400/263; C09J 2427/003; A41H 27/00; Y10T 442/2631; Y10T 428/14; Y10T 428/2481; Y10T 428/28; Y10T 428/2848; A41D 31/085

See application file for complete search history.

(56) References Cited

U.S. PATENT DOCUMENTS

| 7,361,403 B1 * | 4/2008 | Lowe ..................... B32B 27/00 428/353 |
| 2005/0112968 A1 * | 5/2005 | Panse ..................... B32B 27/40 442/59 |
| 2012/0071808 A1 * | 3/2012 | Sato ........................ A61L 15/58 602/54 |

(Continued)

*Primary Examiner* — Patricia L. Nordmeyer
(74) *Attorney, Agent, or Firm* — Michael T. Abramson; Holland & Knight LLP

(57) ABSTRACT

An apparatus and method of manufacture for a repair patch may include a fabric layer, a primer layer applied to the fabric layer, an adhesive layer applied to the primer layer, and a release liner applied to the adhesive layer.

23 Claims, 14 Drawing Sheets

(56) References Cited

U.S. PATENT DOCUMENTS

2014/0349108 A1\* 11/2014 Fung .................. A61L 15/58
                                                                                428/345
2014/0358104 A1\* 12/2014 Tse .................... C09J 183/10
                                                                                604/372

\* cited by examiner

Category: 12 second vertical test    16 3015; V 08/18    RC; MS    RTR 6/15    /d1

TEST PERFORMED: ASTM D 6413 – Standard Test Method for Flame Resistance of Textiles (Vertical Test)

RESULTS:

| Specimen # | Afterflame (seconds) | Afterglow (seconds) | Char Length (mm) | Melting and Dripping (yes/no) |
|---|---|---|---|---|
| Length | | | | |
| 1 | 2.0 | 0 | 44 | No |
| 2 | 0.8 | 0 | 40 | No |
| 3 | 1.1 | 0 | 42 | No |
| 4 | 2.4 | 0 | 57 | No |
| 5 | 1.7 | 0 | 38 | No |
| Avg: | 1.7 | 0 | 44 | |
| Width | | | | |
| 6 | 1.4 | 0 | 41 | No |
| 7 | 1.0 | 0 | 45 | No |
| 8 | 1.5 | 0 | 40 | No |
| 9 | 1.4 | 0 | 35 | No |
| 10 | 1.2 | 0 | 40 | No |
| Avg: | 1.3 | 0 | 40 | |

APPROXIMATE WEIGHT OF MATERIAL (as measured by SGS Govmark): 6.2 oz/yd² (single layer)

REMARKS: 1. Flame impinged on patch area of specimen.
2. Length and width direction [x] marked ( ) not marked by client.
ACCEPTANCE CRITERIA (as cited by client):

After Flame:    Maximum Average each direction: 4 seconds
After Glow:     Maximum Average each direction: 35 seconds
Char Length:    Maximum Average each direction: 5 inches (127 mm)
Melt or Drip:   None Permitted CONCLUSION: Based on the RESULTS and ACCEPTANCE CRITERIA (as cited by client), the item tested:
[x] Complies  ( ) Does not comply

Category: 12 second vertical test    IS 2013; v 03/18    PO: NS    NFPA 6/15    /d1

TEST PERFORMED: ASTM D 6413 - Standard Test Method for Flame Resistance of Textiles (Vertical Test)

RESULTS:

| | Specimen # | Afterflame (seconds) | Afterglow (seconds) | Char Length (mm) | Melting and Dripping (yes/no) |
|---|---|---|---|---|---|
| Length: | 1 | 1.1 | 0 | 37 | No |
| | 2 | 1.5 | 0 | 42 | No |
| | 3 | 1.1 | 0 | 46 | No |
| | 4 | 1.1 | 0 | 49 | No |
| | 5 | 1.5 | 0 | 49 | No |
| | Avg: | 1.3 | 0 | 45 | |
| Width: | 6 | 1.7 | 0 | 46 | No |
| | 7 | 1.3 | 0 | 41 | No |
| | 8 | 1.1 | 0 | 40 | No |
| | 9 | 0.8 | 0 | 39 | No |
| | 10 | 1.7 | 0 | 42 | No |
| | Avg: | 1.3 | 0 | 43 | |

APPROXIMATE WEIGHT OF MATERIAL (as measured by SGS Gormark): 6.2 oz/yd2 (single layer)

REMARKS: 1. Flame impinged on patch area of specimen.
2. Length and width direction [x] marked [ ] not marked by client.

ACCEPTANCE CRITERIA (as cited by client):
After Flame:      Maximum Average each direction:    4 seconds
After Glow:       Maximum Average each direction:    25 seconds
Char Length:      Maximum Average each direction:    5 inches (127mm)
Melt or Drip:     None Permitted CONCLUSION: Based on the RESULTS and ACCEPTANCE CRITERIA (as cited by client), the item tested:
[X] Complies; [ ] Does not comply

Category: 12 second vertical test        IS 2035, V 08/18        PC: MB        WTR 6/15        /dl TEST PERFORMED: ASTM D 6413 - Standard Test Method for Flame Resistance of Textiles (Vertical Test)

RESULTS:

| Specimen # | Afterflame (seconds) | Afterglow (seconds) | Char Length (mm) | Melting and Dripping (yes/no) |
|---|---|---|---|---|
| Length | | | | |
| 1 | 1.5 | 0 | 44 | No |
| 2 | 1.7 | 0 | 48 | No |
| 3 | 2.3 | 0 | 49 | No |
| 4 | 1.5 | 0 | 40 | No |
| 5 | 2.7 | 0 | 53 | No |
| Avg: | 1.9 | 0 | 47 | |
| Width | | | | |
| 6 | 1.1 | 0 | 42 | No |
| 7 | 1.0 | 0 | 48 | No |
| 8 | 0.8 | 0 | 40 | No |
| 9 | 1.1 | 0 | 40 | No |
| 10 | 1.3 | 0 | 45 | No |
| Avg: | 1.1 | 0 | 43 | |

APPROXIMATE WEIGHT OF MATERIAL (as measured by BGA Covmach): 6.4 oz/yd² (single layer)

REMARKS: 1. Flame impinged on patch area of specimen.
2. Length and width direction [x] marked [ ] not marked by client.

ACCEPTANCE CRITERIA (as cited by client):
After Flame:    Maximum Average each direction: 4 seconds
After Glow:     Maximum Average each direction: 25 seconds
Char Length:    Maximum Average each direction: 5 inches (127 mm)
Melt or Drip:   None Permitted CONCLUSION: Based on the RESULTS and ACCEPTANCE CRITERIA (as cited by client), the item tested: [x] Complies, [ ] Does not comply

Category: 12 second vertical test          LC 1015; V 08/16          PO: ME          MTM 6/15          /AA TEST PERFORMED: ASTM D 6413 - Standard Test Method for Flame Resistance of Textiles
(Vertical Test)

RESULTS:

| | Specimen # | Afterflame (seconds) | Afterglow (seconds) | Char Length (mm) | Melting and Dripping (yes/no) |
|---|---|---|---|---|---|
| Length: | 1 | 1.2 | 0 | 40 | NO |
| | 2 | 1.0 | 0 | 38 | NO |
| | 3 | 1.5 | 0 | 37 | NO |
| | 4 | 1.8 | 0 | 38 | NO |
| | 5 | 1.4 | 0 | 40 | NO |
| | Avg: | 1.4 | 0 | 39 | |
| Width: | 6 | 1.5 | 0 | 37 | NO |
| | 7 | 1.8 | 0 | 40 | NO |
| | 8 | 0.9 | 0 | 38 | NO |
| | 9 | 1.5 | 0 | 37 | NO |
| | 10 | 1.4 | 0 | 40 | NO |
| | Avg: | 1.4 | 0 | 40 | |

APPROXIMATE WEIGHT OF MATERIAL (as measured by SGS Covmark): 6.4 oz/yd² (single layer)

REMARKS: 1. Flame impinged on patch area of specimen.
2. Length and width direction [x] marked ( ) not marked by client.

ACCEPTANCE CRITERIA (as cited by client):

After Flame:     Maximum Average each direction:  4 seconds
After Glow:      Maximum Average each direction:  25 seconds
Char Length:     Maximum Average each direction:  5 inches (127 mm)
Melt or Drip:    None Permitted CONCLUSION: Based on the RESULTS and Acceptance CRITERIA (as cited by client), the item tested:
[x] Complies; ( ) does not comply

Category: 12 second vertical test        LX 2015, v 08/18    PO: 065    MTR 6/15    /d)

TEST PERFORMED: ASTM D 6413 - Standard Test Method for Flame Resistance of Textiles
                (Vertical Test)

RESULTS:

| Specimen # | Afterflame (seconds) | Afterglow (seconds) | Char Length (mm) | Melting and Dripping (yes/no) |
|---|---|---|---|---|
| Length: | | | | |
| 1 | 1.4 | 0 | 38 | no |
| 2 | 6.0 | 0 | 78 | no |
| 3 | 2.8 | 0 | 35 | no |
| 4 | 1.3 | 0 | 45 | no |
| 5 | 1.9 | 0 | 43 | no |
| Avg: | 2.7 | 0 | 47 | |
| Width: | | | | |
| 6 | 1.4 | 0 | 40 | no |
| 7 | 1.9 | 0 | 40 | no |
| 8 | 1.5 | 0 | 37 | no |
| 9 | 1.4 | 0 | 35 | no |
| 10 | 1.3 | 0 | 43 | no |
| Avg: | 1.5 | 0 | 39 | |

APPROXIMATE WEIGHT OF MATERIAL (as cited by client): 6.4 oz/yd² (single layer)

REMARKS: 1. Flame impinged on patch area of specimen.
         2. Length and width direction [x] marked [ ] not marked by client.

ACCEPTANCE CRITERIA (as cited by client):

After Flame:    Maximum Average each direction:   4 seconds
After Glow:     Maximum Average each direction:   35 seconds
Char Length:    Maximum Average each direction:   5 inches (127 mm)
Melt or Drip:   None Permitted CONCLUSION: Based on the RESULTS and ACCEPTANCE CRITERIA (as cited by client), the item tested:
            [x] Complies; [ ] Does not comply

Category: 12 second vertical test    16 2015; V 08/18    PC: NS    NFR 6/15    /dl TEST PERFORMED: ASTM D 6413 - Standard Test Method for Flame Resistance of Textiles (Vertical Test)

RESULTS:

| Specimen # | Afterflame (seconds) | Afterglow (seconds) | Char Length (mm) | Melting and Dripping (yes/no) |
|---|---|---|---|---|
| Length: | | | | |
| 1 | 0.9 | 0 | 46 | No |
| 2 | 2.6 | 0 | 42 | No |
| 3 | 3.0 | 0 | 50 | No |
| 4 | 1.4 | 0 | 43 | No |
| 5 | 1.7 | 0 | 44 | No |
| Avg: | 1.9 | 0 | 45 | |
| Width: | | | | |
| 6 | 0.8 | 0 | 30 | No |
| 7 | 1.6 | 0 | 39 | No |
| 8 | 0.9 | 0 | 38 | No |
| 9 | 1.8 | 0 | 43 | No |
| 10 | 0.9 | 0 | 38 | No |
| Avg: | 1.2 | 0 | 37 | |

APPROXIMATE WEIGHT OF MATERIAL (as measured by SGS Gorman): 6.4 oz/yd² (single layer)

REMARKS: 1. Flame impinged on patch area of specimen.
2. Length and width direction [x] not marked [ ] marked by client.

ACCEPTANCE CRITERIA (as cited by client):

After Flame:   Maximum Average each direction: 4 seconds
After Glow:    Maximum Average each direction: 25 seconds
Char Length:   Maximum Average each direction: 5 inches (127 mm)
Melt or Drip:  None Permitted CONCLUSION: Based on the RESULTS and ACCEPTANCE CRITERIA (as cited by client), the item tested: [x] Complies; [ ] Does not comply

Category: 12 second vertical test    LS 2015; V 08/18    PO: 88    BTR 6/15    /dl TEST PERFORMED: ASTM D 6413 – Standard Test Method for Flame Resistance of Textiles
(Vertical test)

RESULTS:

| Specimen # | Afterflame (seconds) | Afterglow (seconds) | Char Length (cm) | Melting and Dripping (yes/no) |
|---|---|---|---|---|
| Length: | | | | |
| 1 | 1.5 | 0 | 32 | No |
| 2 | 1.0 | 0 | 38 | No |
| 3 | 1.2 | 0 | 46 | No |
| 4 | 1.0 | 0 | 40 | No |
| 5 | 1.7 | 0 | 40 | No |
| Avg: | 1.3 | 0 | 39 | |
| Width: | | | | |
| 6 | 3.0 | 0 | 45 | No |
| 7 | 1.3 | 0 | 45 | No |
| 8 | 1.8 | 0 | 47 | No |
| 9 | 1.1 | 0 | 43 | No |
| 10 | 2.7 | 0 | 55 | No |
| Avg: | 2.0 | 0 | 47 | |

APPROXIMATE WEIGHT OF MATERIAL (as measured by SGS Germany): 6.0 oz/yd² (single layer)

REMARKS: 1. Flame impinged on patch area of specimen.
2. Length and width direction [x] not marked [ ] not marked by client.

ACCEPTANCE CRITERIA (as cited by client):

After Flame:     Maximum Average each direction:     4 seconds
After Glow:      Maximum Average each direction:     25 seconds
Char Length:     Maximum Average each direction:     5 inches (127 mm)
Melt or Drip:    None permitted CONCLUSION: Based on the RESULTS and ACCEPTANCE CRITERIA (as cited by client), the item tested:
[x] Complies/[ ] Does not comply

Category: 12 second vertical test    16 2015; V 08/13    PC, ME    BTM 6/15    /AA TEST PERFORMED: ASTM D 6413 - Standard Test Method for Flame Resistance of Textiles (Vertical Test)

RESULTS:

| Specimen # | Afterflame (seconds) | Afterglow (seconds) | Char Length (mm) | Melting and Dripping (yes/no) |
|---|---|---|---|---|
| Length: | | | | |
| 1 | 0.9 | 0 | 44 | No |
| 2 | 0.7 | 0 | 44 | No |
| 3 | 1.4 | 0 | 47 | No |
| 4 | 2.7 | 0 | 54 | No |
| 5 | 1.2 | 0 | 44 | No |
| Avg: | 1.4 | 0 | 49 | |
| Width: | | | | |
| 6 | 1.2 | 0 | 38 | No |
| 7 | 1.4 | 0 | 50 | No |
| 8 | 0.9 | 0 | 35 | No |
| 9 | 1.2 | 0 | 49 | No |
| 10 | 1.5 | 0 | 40 | No |
| Avg: | 1.3 | 0 | 43 | |

APPROXIMATE WEIGHT OF MATERIAL (as measured by SGS Govmark): 6.3 oz/yd² (single layer)

REMARKS:  1. Flame impinged on patch area of specimen.
          2. Length and width direction [x] marked [ ] not marked by client.

ACCEPTANCE CRITERIA (as cited by client):

After Flame:    Maximum Average each direction:  4 seconds
After Glow:     Maximum Average each direction: 25 seconds
Char Length:    Maximum Average each direction:  5 inches (127 mm)
Melt or Drip:   None Permitted CONCLUSION: Based on the RESULTS and ACCEPTANCE CRITERIA (as cited by client), the item tested:
            [x] Complies, [ ] Does not comply

Category: 12 second vertical test     LS 2015; V 08/18     PL: MS     NTR 6/15     /di TEST PERFORMED: ASTM D 6413 - Standard Test Method for Flame Resistance of Textiles (Vertical Test)

RESULTS:

| | Specimen # | Afterflame (seconds) | Afterglow (seconds) | Char Length (cm) | Melting and Dripping (yes/no) |
|---|---|---|---|---|---|
| Length: | 1 | 0.8 | 0 | 46 | No |
| | 2 | 1.2 | 0 | 47 | No |
| | 3 | 1.4 | 0 | 52 | No |
| | 4 | 0.7 | 0 | 48 | No |
| | 5 | 0.9 | 0 | 45 | No |
| | Avg: | 1.0 | 0 | 48 | |
| Width: | 6 | 2.0 | 0 | 47 | No |
| | 7 | 1.3 | 0 | 48 | No |
| | 8 | 1.7 | 0 | 47 | No |
| | 9 | 1.1 | 0 | 39 | No |
| | 10 | 1.6 | 0 | 47 | No |
| | Avg: | 1.5 | 0 | 45 | |

APPROXIMATE WEIGHT OF MATERIAL (as measured by SGS Govmark): 6.1 oz/yd² (single layer)

REMARKS: 1. Flame impinged on patch area of specimen.
2. Length and width direction [x] marked [ ] not marked by client.

ACCEPTANCE CRITERIA (as cited by client):

After Flame:    Maximum Average each direction: 4 seconds
After Glow:     Maximum Average each direction: 25 seconds
Char Length:    Maximum Average each direction: 5 inches (127 mm)
Melt or Drip:   None Permitted CONCLUSION: Based on the RESULTS and ACCEPTANCE CRITERIA (as cited by client), the item tested:
[x] Complies, [ ] Does not comply

QSG Modified AATCC 135, Home Laundering

The sample was washed in cold water on the "regular – small" load setting and dried on the "regular – hot" setting following the procedure in AATCC 135 with a 5lb ballast load using TIDE Original Detergent. A visual inspection of the patch adhesion to the uniform fabric was made after each wash/dry cycle. The results are recorded below.

| Cycle | Condition | Observation | Result |
|---|---|---|---|
| 1 | Wash / Dry | No change from as received for left, right, center coupons | PASS |
| 2 | Wash / Dry | No change from as received for left, right, center coupons | PASS |
| 3 | Wash / Dry | No change from as received for left, right, center coupons | PASS |
| 4 | Wash / Dry | No change from as received for left, right, center coupons | PASS |
| 5 | Wash / Dry | No change from as received for left, right, center coupons | PASS |
| 6 | Wash / Dry | No change from as received for left, right, center coupons | PASS |
| 7 | Wash / Dry | No change from as received for left, right, center coupons | PASS |
| 8 | Wash / Dry | No change from as received for left, right, center coupons | PASS |
| 9 | Wash / Dry | No change from as received for left, right, center coupons | PASS |
| 10 | Wash / Dry | No change from as received for left, right, center coupons | PASS |

FIG. 5

FIELD EXPEDIENT TEXTILE REPAIR PATCH

RELATED CASES

This application claims the benefit of U.S. Provisional Application No. 62/580,738 filed on 2 Nov. 2017, the contents of which are all incorporated by reference.

BACKGROUND

Generally, personal, protective, flame-resistant textile clothing and textile based equipment (e.g., back packs, vest carriers, sleeping bags, pouches, bags, sleeping matts or cots, seating upholstery, tents, etc.) may provide safety and purpose to the end user. Unfortunately, damage (e.g., rips, tears, abrasion, scuffs, etc.) may occur that degrade or even eliminate the usefulness of the damaged object.

BRIEF SUMMARY OF DISCLOSURE

In one example implementation, a method of manufacturing a repair patch may include but is not limited to curing a primer layer. The primer layer may be applied to a fabric layer. An adhesive layer may be applied to the primer layer. A release liner may be applied to the adhesive layer.

One or more of the following example features may be included. The primer layer may be between the fabric layer and the adhesive layer. The primer layer may be applied using a knife over roll technique. The primer layer may be applied using a heat technique. The adhesive layer may be applied using a transfer coating technique. The transfer coating technique may include applying the adhesive directly to the release liner via lamination. The adhesive layer may be a pressure sensitive adhesive. The adhesive layer may have a weight between 30-150 lbs./ream. The adhesive layer may have a thickness between 3-7 millimeters. The primer layer may have a weight between 30-120 lbs./ream. The primer layer may have a thickness between 3-6 millimeters. The primer layer may form a cohesive link to permanently bond the fabric layer, the primer layer, and the adhesive layer.

In another example implementation, a repair patch may include but is not limited to a fabric layer, a primer layer applied to the fabric layer, an adhesive layer applied to the primer layer, and a release liner applied to the adhesive layer.

One or more of the following example features may be included. The fabric layer may include a single fiber type. The fabric layer may include a blend of fiber types. The fabric layer may be flame resistant. The fabric layer may include a finish. The adhesive layer may be a pressure sensitive adhesive. The adhesive layer may have a weight between 30-150 lbs./ream. The adhesive layer may have a thickness between 3-7 millimeters. The primer layer may have a weight between 30-120 lbs./ream. The primer layer may have a thickness between 3-6 millimeters. The primer layer may form a cohesive link to permanently bond the fabric layer, the primer layer, and the adhesive layer.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Figure 4B:
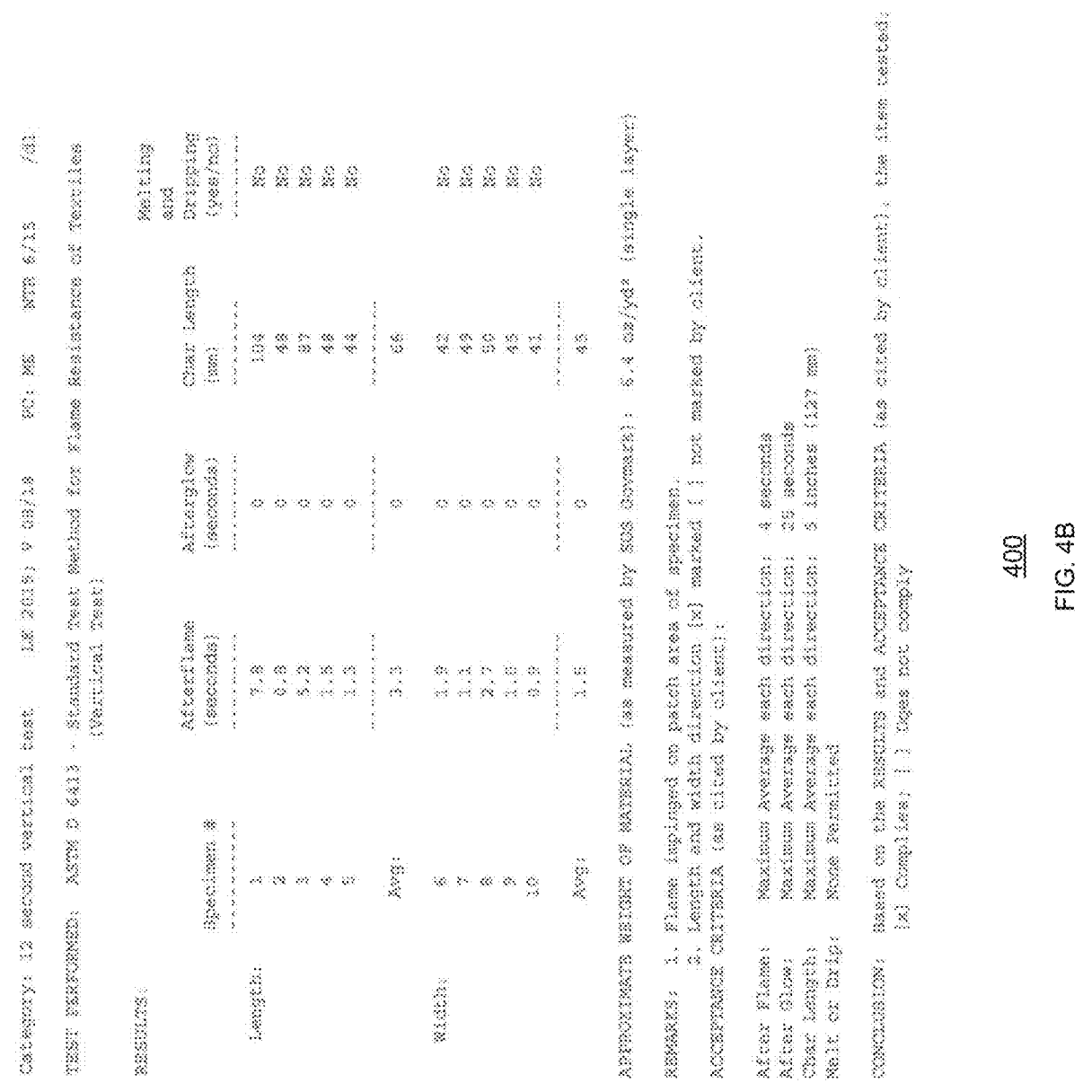

FIG. 4A-4J are example flame test results of a repair patch according to one or more example implementations of the disclosure; and FIG. 5 is an example laundering test result of a repair patch according to one or more example implementations of the disclosure.

Like reference symbols in the various drawings indicate like elements.

DETAILED DESCRIPTION

Figure 1:
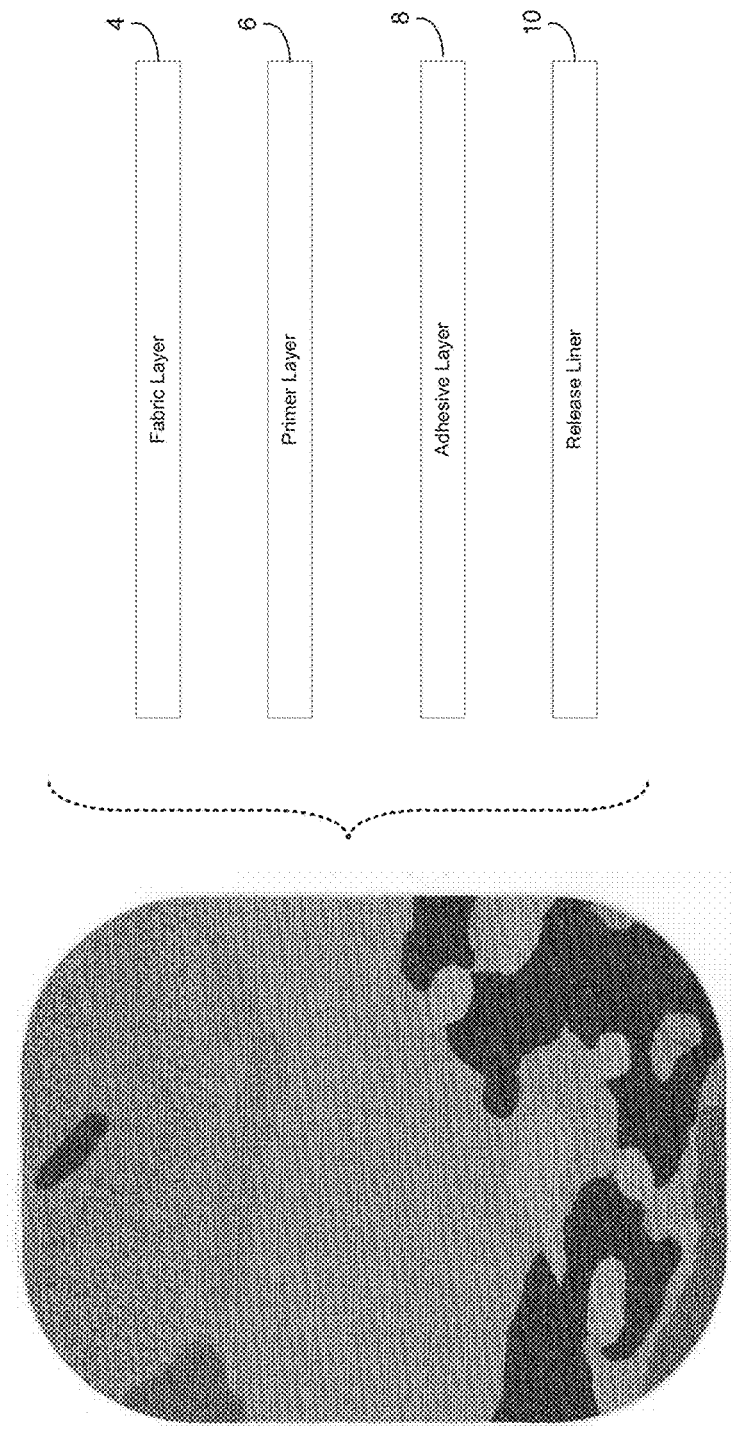
FIG. 1 is an example diagrammatic view of a repair patch according to one or more example implementations of the disclosure.
Figure 2:
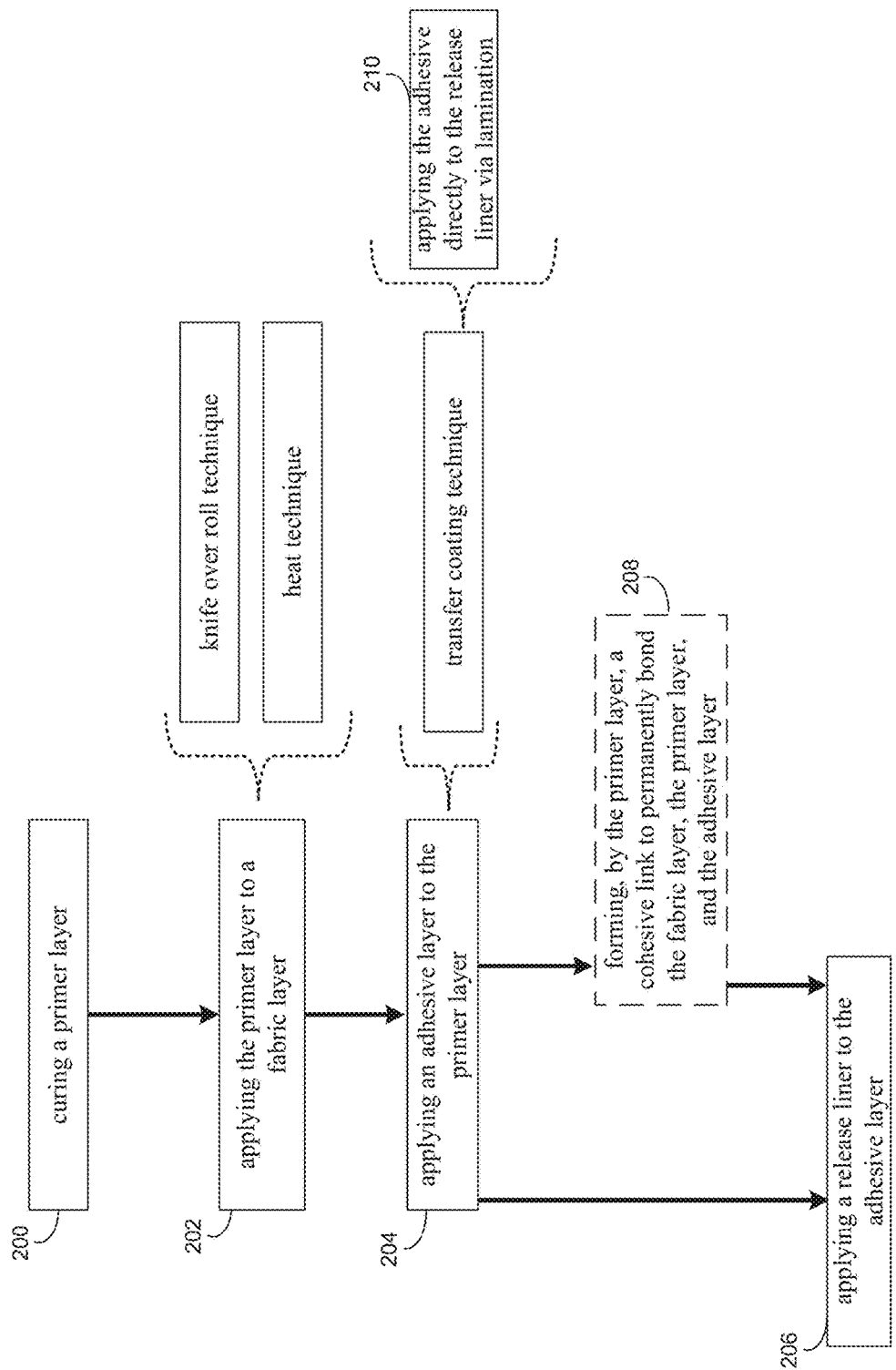
FIG. 2 is an example flowchart of manufacturing a repair patch according to one or more example implementations of the disclosure.

Generally, as noted above, personal, protective, flame-resistant textile clothing and textile based equipment (e.g., back packs, vest carriers, sleeping bags, pouches, bags, sleeping matts or cots, seating upholstery, tents, etc.) may provide safety and purpose to the end user. Unfortunately, even with regular use, damage (e.g., rips, tears, abrasion, scuffs, etc.) may occur. There may be situations where the damage occurs during field use (e.g., without the infrastructure, necessary tools and/or equipment needed to perform a repair). Damage may alter the performance of critical pieces of clothing or textile based equipment, but may also result in injury because the garment or equipment has been compromised. Once damage has occurred, the damage may subsequently decrease the useful life of the clothing and equipment.

In some situations, the quickest way to make repairs may be to apply a repair patch to close the rip, tear, hole or a damaged area. Generally, such patches may require the application of extra glue, a heat source, and/or special tools to make use of the patch during repair. Having a separate container with glue may not be efficient. The container may open, puncture or break, exposing the glue to other equipment. The glue may also require extensive time to dry and seal to complete the repair before it can be used. It is also an extra item with additional weight needed to be carried just to perform a potential repair. This type of repair may be best served in a controlled environment, and not in the field.

Alternatively, the patch may be sewn instead of using glue, but this may still leave the damaged area susceptible to more damage if not sewn correctly. Moreover, a user may have to have a basic knowledge or skill to conduct a proper sewn repair. Depending on the level of a sewn repair needed, the sewn repair may still create an opening if not closed completely, leaving it compromised for future damage. The sewing kit may also be an extra item with additional weight needed to be carried just to perform a potential repair.

Yet another alternative is a repair patch that may use thermoset adhesives already applied to a patch. Thermoset repair patches generally require an external electronic heat source or tool to efficiently activate the adhesive, thus melting or thermosetting the patch to the repair area. Again, such a patch may require the end user conducting the repair to have the proper equipment and skill to perform the repair, combined with some sort of power source. End users in remote or austere environments may not find this feasible, leading to extra weight and additional gear just to perform a potential repair.

Therefore, as will be discussed in greater detail, a piece of material (e.g., fabric or textile) with a stable adhesive (e.g., a pressure sensitive adhesive) already applied to the fabric in the form of a precut patch may rapidly be employed to perform necessary repair, and maintain the protective clothing or gear by, e.g., sealing the repair from various elements without leaving it prone to further damage. In some implementations, the improved repair patch may be applied easily as a "peel and stick" solution while in the field. Moreover, this type of improved repair patch combines the strength of an adhesive, ease of use, without needing any additional training, skills, extra or multiple pieces of equipment/parts (other than the patch itself) or power source to make the repair, and may be easily accomplished in almost any environment.

To maintain the protective properties (e.g., flame resistance) of the garment or textile based equipment, the repair patch may include flame resistant properties and may be tested for adequate adhesion strength. Thus, the patch may remain durable while the clothing item or equipment remains in further use. This way, the patch may provide a level of safety and durability to maintain protective properties of the garment and/or equipment, but may also extend the useful life of the item. As will also be discussed below, the present disclosure includes unique and improved technology used in the construction of the repair patch to enhance performance, durability and structure (e.g., the area of the pressure sensitive adhesive, its interface with the fabric included in the construction of the repair patch itself, all while maintaining the performance and protective attributes of the intended application). Such enhancements may make the patch last longer, add durability to the structure, especially during laundering, and the ability to use a broader variety of fabrics in the construction of the patch.

As discussed above and referring also at least to the example implementations of FIGS. 1-5, a repair patch (e.g., repair patch 2) may include but is not limited to a fabric layer, a primer layer applied to the fabric layer, an adhesive layer applied to the primer layer, and a release liner applied to the adhesive layer. As will also be discussed below, a method of manufacturing repair patch 2 may include but is not limited to curing 200 a primer layer. The primer layer may be applied 202 to a fabric layer. An adhesive layer may be applied 204 to the primer layer. A release liner may be applied 206 to the adhesive layer.

In some implementations, and referring at least to the example implementation of FIG. 1, an example repair patch (e.g., repair patch 2) is shown. Repair patch 2 may be made up of at least four parts. For instance, in some implementations, repair patch 2 may include a fabric layer (e.g., fabric layer 4), a primer layer (e.g., primer layer 6) applied to fabric layer 4, an adhesive layer (e.g., adhesive layer 8) applied to primer layer 6, and a release liner (e.g., release liner 10) applied to the adhesive layer. In some implementations, as shown in FIG. 1, primer layer 6 may be between fabric layer 4 and adhesive layer 8. In some implementations, primer layer 6 generally cannot be applied on both sides of fabric layer 4, as this may distort and/or change the face of the fabric. As a result, this may obscure the ability of the patch to blend with the repaired or covered area.

In some implementations, fabric layer 4 may include a fabric, that may be made up of a fiber or blend of fibers in either natural (e.g., cotton, wool, etc.) or synthetic (e.g., FR Rayon, Nomex, Nylon, Polyester, Kevlar, Twaron, etc. Such fibers may be flame resistant, non-flame resistant, and may be in a color or pattern to closely resemble that of the item to which the repair patch is being applied. In some implementations, the fabric may be constructed with textiles (e.g., yarns) consisting of flame resistant fibers, flame resistant treated yarns and non-flame-resistant fibers and yarns to be used as fabric layer 4. In some implementations, the fabric may be woven, non-woven, and knit, and may include any material capable of being used in the present disclosure to retain the example advantages described herein. The fabric may be important, as this may be the base substrate of repair patch 2. Fabric layer 4 may support primer layer 6 and adhesive layer 8 (discussed more below). In some implementations, color and pattern of repair patch 2 may be chosen specifically to match or closely resemble that of the clothing or item of gear that is being repaired. Fabrics may vary in weight, but should be durable and flame resistant (when necessary) for the repair patch.

In some implementations, fabric layer 4 may include a finish. For example, fabrics used in the construction of repair patch 2 may be treated or finished from a fabric mill with various finishes for, e.g., water resistance, stain resistance, insect resistance and durability. These finishes may be useful if used in combination with the adhesive portion and primer layer 6 of repair patch 2. Often, various finished fabrics may include various chemistry compounds used in the dying, printing and finishing process. Specific to the finishing process, fabrics may be treated with finishes using hydrophobic compounds to create water resistance, stain resistance and durable press finishes. These finishes, may create a low surface energy that resists adhesion or may obstruct the interface between adhesive and fabric because of surface energy. In some instances, the adhesive may appear to be coated to the fabric, but when exposed to water and/or peel testing, the adhesive may separate from the fabric itself. That is, the adhesive does not cohesively bond to the finish that is applied to the fabric, and creates a surface that appears to bond with the adhesive but when washed, or peel tested for strength of adhesion, the adhesive comes off or separates from the finish/fabric. Although, fabrics without the presence of finishes may be used, finishes may add strength in terms of dimensional stability, abrasion resistance, tear and tensile strength, making fabrics with finishes better suited to add to the structural strength of repair patch 2. It will be appreciated that the term "finish" and "treatment" may be used interchangeably.

In some implementations, primer layer 6 may create a surface that may efficiently tie or bond the fabric to the pressure sensitive adhesive, overcoming any finish or treatment and making the adhesive compatible to the existing fabric. The primer may utilize chemistry (e.g., solvents, etc.) to achieve a bond to the finished fabric. The primer may then be engineered to "tie" the adhesive, thus creating a link to the fabric with strength and durability.

In some implementations, primer layer 6 may be cured 200 and primer layer 6 may be applied 202 to (e.g., the backside of) the fabric. In some implementations, primer layer 6 that is applied directly (or indirectly) to the backside of fabric layer 4 may have a thickness of, e.g., 3-6 mils with a weight of, e.g., 30-120 lbs./ream. However, it will be appreciated that heavier, lighter, thicker and thinner primer layers may be used. With that being said, during development of the present disclosure, it was discovered that going higher in the adhesive thickness may have adverse effects (e.g., it does not cure properly, has increased flow and softness, the equipment used to manufacture and apply coating cannot properly heat and setup the adhesive to adequately work for the intended application, etc.). In some implementations, primer layer 6 may be designed to adhere to the backside of fabric layer 4 permanently as a physical barrier (e.g., a layer of chemically formulated liquid that is applied and cured, and when cured forms a dried barrier that inhibits the movement of pressure sensitive adhesive) between the adhesive and the fabric, which may localize the pressure sensitive adhesive to create long term adhesion strength and provide added flame resistance to the adhesive, thus creating stability for flame resistance requirements.

In some implementations, primer layer 6 may form 208 a cohesive link to permanently bond the fabric layer, the primer layer, and the adhesive layer. For example, primer layer 6 may be specifically formulated in conjunction with the pressure sensitive adhesive to achieve a cohesive link, bonding fabric layer 4, primer layer 6, and adhesive layer 8 permanently. The primer may act as a permanent barrier or layer that adheres to the pressure sensitive adhesive (e.g., adhesive layer 8). Primer layer 6 may include additional flame resistant compounds (e.g., non-halogenated compounds) and the means to "tie" or bond the pressure sensitive adhesive to the fabric itself. That is, the primer layer may create a surface designed to include chemical properties that bonds directly to the fabric with finish, thus creating a surface that binds the adhesive to the fabric. For example, the chemistry may include a PVC coating that may be coated wet as a liquid plastisol to flow into the fabric and fused at, e.g., 300-400 F to turn solid and bond the fabric. This plastisol may have additional flame retardants added to it but in reference to bonding the fabric, this layer may be put on wet or possibly done via heating a solid layer to create the bond and barrier. The process done wet may allow deeper penetration into the fibers to create a permanent bond and barrier between the fabric and adhesive layers. The PVC may have a high surface energy that allows the pressure sensitive adhesive a great surface to anchor to and allow for a permanent bond. Generally, primer layer 6 may create a surface, bonding the pressure sensitive adhesive permanently to the primer, but also creating a barrier to stop the adhesive from migrating to the face of the fabric, caused by loosing adhesion over time by means of "cold migration."

In some implementations, primer layer 6 may be applied 202 using a knife over roll technique. For example, during the manufacturing coating process, the primer may be applied using a "knife over roll technique" in one or more passes. For example, this technique may include the primer layer being coated with a machine (e.g., a "roll coater" or a "coating line") where the liquid primer is flooded onto the fabric and metered off with a blade (e.g., doctor blade or equivalent). It will be appreciated that other means of coating are possible without departing from the scope of the disclosure, depending on combination of primer and/or pressure sensitive adhesive weight, primer and/or pressure sensitive adhesive thickness, and physical fabric construction. For example, in some implementations, primer layer 6 may be applied 202 using a heat technique. For example, with this technique, a pre-coated or pre-dried film (e.g., primer layer, adhesive layer, etc.) may be melted with heat onto the fabric to form a barrier that would inhibit the secondary adhesive from pushing through the fabric. As such, the use of a knife over roll technique should be taken as example only and not to otherwise limit the scope of the disclosure.

In some implementations, during the curing process, the primer may be applied as a liquid and fused with heat into a solid film. This may occur when the solvent is dried off and the film can crosslink with heat. Post curing 200 of the primer, adhesive layer 8, which may include a pressure sensitive adhesive, may be applied 204 to the primer layer, and release liner 10 may be applied 206 to adhesive layer 8. Release liner 10 may generally be described as a protective layer (e.g., paper, film, etc.) that is removed before application. The paper/film of release liner 10 may have a coating (e.g., a silicone coating) on one or both sides for processing. In some implementations, repair patch 2 may then be die cut to specific dimensions and packaged for use.

In some implementations, adhesive layer 8 (e.g., a pressure sensitive adhesive layer) may be compounded for adhesion strength and durability against, e.g., laundering and flame resistance. For instance, the adhesive should be formulated to meet the needs of the application, and in this example, it may be compounded with waxes and/or tackifiers to make it flame retardant and allow it to bond through the wash cycles. Components may be added to a base adhesive to perform. As noted above, adhesive layer 8 may be applied 204 to the cured primer coating via lamination (e.g., using heat to apply the adhesive) after knife over roll coating on liner and drying. Formulated with a blend of, e.g., rosin ester tackifier acrylic with olefin and paraffin chlorinated waxes for flame resistance, the adhesive does not inhibit the flame resistant performance properties of flame resistant protective clothing or equipment. It will be appreciated that other formulations may be used without departing from the scope of the present disclosure. Adhesive layer 8 may be applied 204 using a transfer coating technique/process where the pressure sensitive adhesive may be applied 210 directly to release liner 10 via lamination after knife over roll coating on the liner and drying. In some implementations, the weight of the pressure sensitive adhesive may range between, e.g., 30-150 lbs./ream with a thickness of, e.g., 3-7 mils dry. However, it will be appreciated that heavier, lighter, thicker and thinner adhesive layers may be used. For example, a thinner fabric with a tighter weave may not need as much adhesive.

In some implementations, fabric layer 4, primer layer 6 and adhesive layer 8 may be all designed to be compatible. For example, if they are not compatible (e.g., the primer is not compatible with the pressure sensitive adhesive), the end result will not perform adequately or be stable.

The example and non-limiting advantages of repair patch 2 may include, e.g., peel adhesion strength, flame resistance, and improved laundering of the applied repair patch to create a stronger cohesive system. Repair patch 2 may interface with a broad variety of fabrics, lock the yarns of the fabric together, and may overcome finishes applied to the fabric using the primer layer (e.g., some fabrics may have a "finish" on them like a waterproofer, that may make it difficult to get coatings to adhere to them) by creating a layer that provides a surface that promotes adhesion of the pressure sensitive adhesive to the primer and fabric layer. Shelf life may be improved through stability of the adhesive staying localized and concentrated to primer layer 6 on the back of fabric layer 4 through, e.g., chemical composition compatibility. Primer layer 6 may act as a barrier to stop cold migration of the adhesive over time to the face fabric losing adhesion strength before the repair patch is applied.

Figure 3:
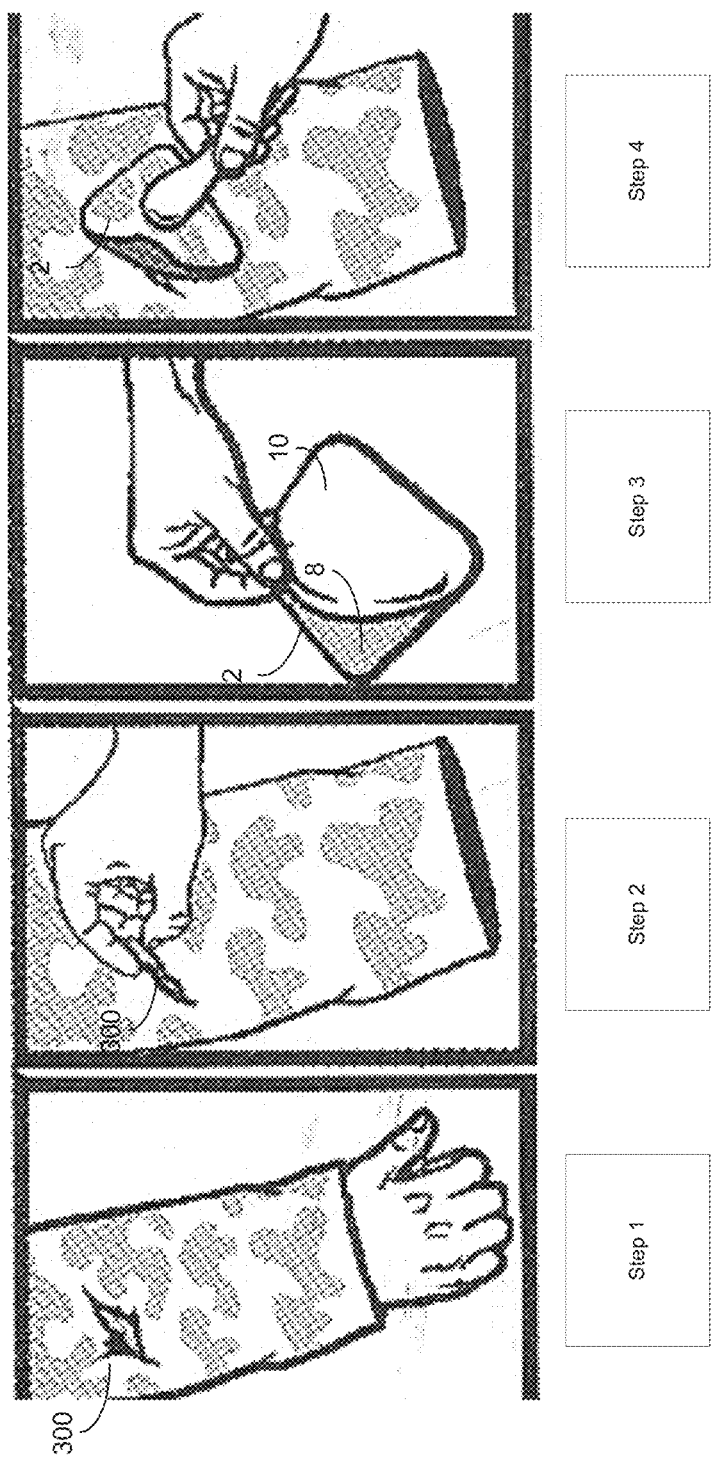
FIG. 3 is an example diagrammatic view of a method of applying a repair patch according to one or more example implementations of the disclosure.

Referring at least to the example implementation of FIG. 3, an example use of repair 2 is shown. In the example, the end user may notice damage (e.g., rip 300) in the arm of a jacket in step 1. The user may clean or removes any dirt or debris that may inhibit adhesion. The user may pull together the tear, rip or hole, removing any stray or loose threads or yarns if needed and may bring the fabric together as shown in step 2. In the example, release liner layer 10 that covers the pressure sensitive adhesive (e.g., adhesive layer 8) may be removed as shown in step 3. In step 4, patch 2 may be applied over the damaged area (e.g., rip 300) with adhesive layer 8 facing rip 300. Generally, enough space should be provided between the damaged area and the outer edge of the patch to effectively cover the repair. While not necessarily required, it may be beneficial to use a rounded instrument or object, and hand rub with the instrument over patch 2 by applying pressure for, e.g., 60-90 seconds over the entire surface of repair patch 2. Typically, the pressure causes the adhesive to flow into the substrate and with time, bonds to it. When applying the patch with firm pressure over the entire face of the patch to the repaired area, heat generated by friction "warms up" the adhesive allowing it penetrate deeper within the applied surface. Firm pressure "pushes" the adhesive to grab the surface, allowing for stronger consistent adhesion across the patch. Shortly thereafter (e.g., within minutes, or sooner) the repair is set up and ready to use. Typically, after 24 hours, the patch may also be laundered. It will be appreciated that the particular application and use of patch 2 shown in FIG. 3 may vary without departing from the scope of the disclosure. For example, patch 2 may be used on objects other than the jacket shown in FIG. 3 (e.g., (e.g., back packs, vest carriers, sleeping bags, pouches, bags, sleeping matts or cots, seating upholstery, tents, gun holsters, etc.)

To help show how repair patch 2 may have advantages not known to be available to another repair patch, different test methods have been completed to measure, e.g., peel strength, flame resistance, and laundering resistance. For example, and referring at least to example FIGS. 4A-4J, example flame test results 400 are shown. In the example, flame testing is a key performance attribute for applications where flame resistance is required. For this example test, ASTM 6413 D Vertical Flame Test is used to evaluate flame resistance. For the test, cut patches (of patch 2) are affixed in accordance to ASTM 6413 standard and evaluated for char length, after flame, afterglow and melting and dripping. Observations are recorded per standard criteria and evaluated against that of the given criteria for a protective garment or piece of textile equipment if required. ASTM vertical flame resistance testing is often seen as a standard for protective apparel or flame resistance measurement of textiles, but other tests such as NFPA standards, ISO standards, ANSI standards, etc. may be used. In the example, the numbers are based on performance specifications set forth by the Army and indicate the performance parameters used to define the level flame resistance. "After flame" means how long it takes for the flame to self-extinguish, "after glow" is how long it takes for an ember to self-extinguish and "char length" is the damage done to the fabric after flame exposure.

As another example, and referring at least to example FIG. 5, an example laundering test result 500 is shown. Laundering may be another key performance attribute. Repairs should be able to resist laundering, giving the repaired item extended useful life. That is, a repair patch without the benefits of the present disclosure may come off when laundered, and thus may not be as useful or practical. In this instance, washing or laundering is a means of measurement. In this test, a modified AATCC 135 test is used of dimensional stability of textiles. In this test, fabrics are subjected to repeated wash and dry cycles. This test is used as it outlines certain conditions and methodology to include the type of washing machine and detergent in a controlled environment.

In the modified use of AATCC 135, cut patches 2 are taken from a completed coated fabric production run. These cut repair patches 2 are applied to the fabric used specifically or as close to the application where a potential patch 2 would be needed to repair. For example, fabric used in a flame-resistant combat uniform, flame resistant protective coverall, firefighting clothing, etc. may be used and repair patches applied to these pieces of fabric (or other object or textile). The patch 2 or patches are applied in their typical fashion (e.g., as discussed above). Once applied, the repair patches wait for 24 hours prior to washing and drying. After 24 hours, the applied patches are washed continuously in cold water with a cup of non-alkali detergent and 5 pound "dummy" wash load to replicate a typical load of laundry using the permanent press setting on the washing machine. Once the wash cycle is completed, the applied patches and dummy load are then removed and placed in a laundry dryer at medium heat setting until the patches are dry. Once completed, the dried and applied patches are visually inspected for adhesion to the applied fabric substrate (e.g., the repaired item). The procedure is then conducted repeatedly for 9 full wash and dry cycles. At the end of the 10 cycles the patch is evaluated for adhesion. Passing results indicate that the patch is still visually applied the substrate fabric without visual loss of adhesion or separation of patch adhesive from the applied textiles.

Accordingly, the present disclosure discusses a more effective technique and advanced patch used to repair a textile in protective (and non-protective) clothing and textile based equipment. The present disclosure is not generally applicable for use as a medical bandage or in other such applications where breathability is required. The disclosure may be used as means to camouflage something solid like plastic or hard object comprised of various polymers, even if there is no damage to the object to be camouflaged. An example may include a plastic case, non-textile or leather based gun holster, plastic or metal ammunition magazine where the patch is constructed of printed camouflage pattern or if a color change is applicable. In some implementations, repair patch 2 may be used as tape to attach two objects together if something more specific for that use is not readily available.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A repair patch comprising:
    a fabric layer;
    a primer layer applied to the fabric layer, wherein the primer layer includes one or more solvents in a cured primer layer that is cured to the fabric layer;
    an adhesive layer applied to the cured primer layer;
    a cohesive link that permanently bonds together the fabric layer, the cured primer layer, and the adhesive layer based upon the primer layer with the one or more solvents in the cured primer layer that is cured to the fabric layer, whereby the cured primer layer via the one or more solvents penetrates into fibers of the fabric layer to provide the cohesive link and a physical barrier between the fabric layer and the adhesive layer; and
    a release liner applied to the adhesive layer.

2. The repair patch of claim 1 wherein the fabric layer includes a single fiber type.

3. The repair patch of claim 1 wherein the fabric layer includes a blend of fiber types.

4. The repair patch of claim 1 wherein the fabric layer is flame resistant.

5. The repair patch of claim 1 wherein the fabric layer includes a finish.

6. The repair patch of claim 5 wherein the finish includes at least one of a water resistance finish, an insect resistance finish, and a durability finish.

7. The repair patch of claim 1 wherein the adhesive layer is a pressure sensitive adhesive.

8. The repair patch of claim 1 wherein the adhesive layer has a weight between 30-150 lbs./ream.

9. The repair patch of claim 1 wherein the adhesive layer has a thickness between 3-7 mils.

10. The repair patch of claim 1 wherein the primer layer has a weight between 30-120 lbs./ream.

11. The repair patch of claim 1 wherein the primer layer has a thickness between 3-6 mils.

12. A method for manufacturing a repair patch comprising:
    curing a primer layer;
    applying the primer layer to a fabric layer in a cured primer layer that is cured to the fabric layer;
    applying an adhesive layer to the cured primer layer;
    a cohesive link that permanently bonds together the fabric layer, the cured primer layer, and the adhesive layer based upon the primer layer with the one or more solvents in the cured primer layer that is cured to the fabric layer, whereby the cured primer layer via the one or more solvents penetrates into fibers of the fabric layer to provide the cohesive link and a physical barrier between the fabric layer and the adhesive layer; and
    applying a release liner to the adhesive layer.

13. The method of claim 12 wherein the primer layer is between the fabric layer and the adhesive layer.

14. The method of claim 12 wherein the primer layer is applied using a knife over roll technique.

15. The method of claim 12 wherein the primer layer is applied using a heat technique.

16. The method of claim 12 wherein the adhesive layer is applied using a transfer coating technique.

17. The method of claim 16 wherein the transfer coating technique includes applying the adhesive directly to the release liner via lamination.

18. The method of claim 12 wherein the adhesive layer is a pressure sensitive adhesive.

19. The method of claim 12 wherein the adhesive layer has a weight between 30-150 lbs./ream.

20. The method of claim 12 wherein the adhesive layer has a thickness between 3-7 mils.

21. The method of claim 12 wherein the primer layer has a weight between 30-120 lbs./ream.

22. The method of claim 12 wherein the primer layer has a thickness between 3-6 mils.

23. The method of claim 12 wherein the fabric layer includes one or more finishes, and wherein the one or more finishes includes at least one of a water resistance finish, an insect resistance finish, and a durability finish.

* * * * *